(12) United States Patent
Kawecki

(10) Patent No.: US 9,770,793 B2
(45) Date of Patent: Sep. 26, 2017

(54) METHOD OF CONTINUOUS AUTOMATED MANUFACTURE OF A LINEAR SHEET METAL CONSTRUCTION TRUSS

(71) Applicant: David Joseph Kawecki, San Francisco, CA (US)

(72) Inventor: David Joseph Kawecki, San Francisco, CA (US)

(*) Notice: Subject to any disclaimer, the term of this patent is extended or adjusted under 35 U.S.C. 154(b) by 487 days.

(21) Appl. No.: 13/969,321

(22) Filed: Aug. 16, 2013

(65) Prior Publication Data
US 2015/0047199 A1    Feb. 19, 2015
US 2017/0225279 A9    Aug. 10, 2017

Related U.S. Application Data

(62) Division of application No. 13/078,910, filed on Apr. 1, 2011, now abandoned.

(60) Provisional application No. 61/460,163, filed on Dec. 27, 2010.

(51) Int. Cl.
*B23P 15/00*        (2006.01)
*E04C 3/09*         (2006.01)
*E04C 3/04*         (2006.01)

(52) U.S. Cl.
CPC .............. *B23P 15/00* (2013.01); *E04C 3/09* (2013.01); *E04C 2003/0495* (2013.01); *Y10T 29/49625* (2015.01); *Y10T 29/49634* (2015.01)

(58) Field of Classification Search
CPC .... B23P 15/00; E04C 3/09; E04C 2003/0495; Y10T 29/49625; Y10T 29/49634
See application file for complete search history.

(56) References Cited

U.S. PATENT DOCUMENTS

| | | | | |
|---|---|---|---|---|
| 3,237,362 A | * | 3/1966 | Fromson | E04C 2/34 428/166 |
| 3,296,767 A | * | 1/1967 | Lebowitz | E04B 1/19 52/634 |
| 3,783,498 A | * | 1/1974 | Moyer | B21D 47/04 228/147 |
| 3,831,503 A | * | 8/1974 | Tranquillitsky | B31B 3/00 428/542.2 |
| 4,023,683 A | * | 5/1977 | Vargo | A47B 96/1475 211/192 |
| 4,142,321 A | * | 3/1979 | Coppa | A63H 33/16 273/155 |
| 5,069,948 A | * | 12/1991 | Fromson | E04B 1/344 428/12 |

(Continued)

*Primary Examiner* — Sarang Afzali
(74) *Attorney, Agent, or Firm* — Larisa Migachyov

(57) ABSTRACT

A linear construction truss comprising a hollow shell with a square cross section and a core composed of linked tetrahedra, and a method of manufacturing of said linear construction truss comprising the steps of bending sheet metal strips to create a tetrahedral core such that the faces of the tetrahedral alternate between approximately 109.5 degrees and approximately 289.5 degrees throughout the length of the sheet metal strips. Strips of sheet metal are further bent to form a hollow shell with a square cross section rigidly attached to the core in a spiral pattern. The triangular faces are chamfered to better enable the connection between the core and hollow shell. The sheet metal is cut in such a way such that the perforations do not impinge on the edges of the tetrahedral.

6 Claims, 14 Drawing Sheets

(56) References Cited

U.S. PATENT DOCUMENTS

| | | | | |
|---|---|---|---|---|
| 5,701,713 | A * | 12/1997 | Silver | E04C 3/005 |
| | | | | 52/639 |
| 5,962,150 | A * | 10/1999 | Priluck | B21F 27/02 |
| | | | | 140/5 |
| 6,190,756 | B1 * | 2/2001 | Yokoyama | B65D 5/5033 |
| | | | | 206/814 |
| 6,295,785 | B1 * | 10/2001 | Herrmann | E04B 1/3211 |
| | | | | 52/639 |
| 6,451,235 | B1 * | 9/2002 | Owens | D21J 3/00 |
| | | | | 162/218 |
| 8,176,635 | B2 * | 5/2012 | Queheillalt | B21C 23/14 |
| | | | | 29/897 |
| 2003/0146346 | A1 * | 8/2003 | Chapman, Jr. | B29C 66/721 |
| | | | | 244/123.3 |
| 2004/0154252 | A1 * | 8/2004 | Sypeck | B29D 24/00 |
| | | | | 52/506.01 |
| 2004/0194411 | A1 * | 10/2004 | Olsson | E04B 1/19 |
| | | | | 52/633 |
| 2005/0115186 | A1 * | 6/2005 | Jensen | A45F 3/04 |
| | | | | 52/633 |
| 2005/0183376 | A1 * | 8/2005 | Shoji | B62D 33/046 |
| | | | | 52/633 |
| 2006/0032178 | A1 * | 2/2006 | Jensen | B29C 70/50 |
| | | | | 52/633 |
| 2006/0042180 | A1 * | 3/2006 | Williams | E04C 3/28 |
| | | | | 52/633 |
| 2007/0044415 | A1 * | 3/2007 | Merrifield | E04B 1/3441 |
| | | | | 52/633 |
| 2007/0130874 | A1 * | 6/2007 | Teng-Fu | A47B 96/1408 |
| | | | | 52/633 |
| 2012/0151868 | A1 * | 6/2012 | Kang | B21F 27/128 |
| | | | | 52/649.1 |
| 2012/0285114 | A1 * | 11/2012 | Queheillalt | B21C 23/14 |
| | | | | 52/634 |

\* cited by examiner

METHOD OF CONTINUOUS AUTOMATED MANUFACTURE OF A LINEAR SHEET METAL CONSTRUCTION TRUSS

CROSS-REFERENCE TO RELATED APPLICATIONS

This application is a divisional application of application Ser. No. 13/078,910, filed Apr. 1, 2011, which claims the benefit of Provisional Patent Application No. 61/460,163, filed Dec. 27, 2010.

BACKGROUND

Field of Invention

This invention relates to an improved design for a linear construction truss and a method of manufacturing said linear construction truss.

Prior Art

There are many designs for linear members (beams and trusses) used in construction. Such linear members have to be resistant to shear stress and bending, since the loads on them are typically perpendicular to the axis of the linear member. The I-beam is one example of such a linear member. While the I-beam is an efficient design in that it concentrates the material where the largest linear stress is bound to occur, the manufacturing process for making I-beams involves hot rolling, which is very energy-intensive and environmentally damaging; furthermore, steel I-beams are relatively heavy.

Another possible type of design for a linear member is a hollow sheet metal box beam, such as the one described in U.S. Pat. No. 2,007,898 to Ragsdale. Ragsdale discloses a hollow sheet metal beam with a generally rectangular cross section. While such beams are lightweight and do not require energy-intensive hot rolling methods to construct, a beam with a hollow cross-section is not very strong, and susceptible to buckling.

Due to the advantages offered by a sheet metal construction over an I-beam or a lumber beam, many attempts have been made to reinforce a hollow sheet metal beam from the inside. One such design for a reinforced hollow sheet metal beam is disclosed in U.S. Pat. No. 3,783,498 to Moyer (shown in FIG. 1). Moyer discloses a beam with a hexagonal cross-section, made of sheet metal and welded. The beam is reinforced at two of its vertical sides with sheet metal strips welded to those two sides. These strips provide extra strength on the sides that bear the most stress. However, due to the fact that the horizontal sides are not reinforced and that there is no reinforcing elements on the interior of the beam, the resulting linear member is still not strong enough for some purposes.

Another method of reinforcing the interior of a hollow sheet metal beam is disclosed in U.S. Pat. No. 4,023,683 to Vargo. Vargo discloses reinforcing the interior of a hollow sheet metal beam with one or more planar webs. While that design is stronger than a simple hollow sheet metal beam, it is still not strong enough for some construction applications. One of the reasons for its relative lack of strength is that the planar webs are aligned with the axis of the beam, which increases the strain on these webs in normal operation.

SUMMARY OF THE INVENTION

The object of the present invention is to provide a linear member (a linear construction truss) that is stronger than prior art reinforced hollow beams, and to provide a method of manufacturing the linear construction truss that does not involve hot-rolled processes.

A linear member designed in accordance with the present invention is a linear construction truss comprising a hollow shell with a square cross-section and a reinforcing core of linked regular tetrahedra whose edge length is approximately equal to the inner diagonal of the cross-section of the hollow shell, the core being rigidly attached to the hollow shell. Such a design offers many advantages, one of them being that rather than providing a single planar web to reinforce a hollow beam, the design provides many planar webs (i.e. the faces of the tetrahedra), which are disposed at varying oblique angles relative to the axis of the linear construction truss. This reduces the linear strain on the reinforcing material and renders the linear member stronger. Furthermore, the inter-tetrahedral webs reinforce alternate diagonals of the hollow shell, which also improves its strength and resistance to buckling.

The intra-tetrahedral edges, when joined to the shell, comprise two single layer struts, three double layer struts, and two triple layer struts per linear tetrahedral module. The double and triple layer struts join to form two double layer and two triple layer helices coiling in opposite directions along the length of the truss. These mutually reinforcing structures arrange in an X-form triangulation of the diametric shell corners per tetrahedral module, normal to the rectangular shell's axis. These bi-directional coiling elements impart a cable-like resilience to the structure, and render it stronger than prior art reinforced hollow beams.

In a preferred embodiment, both the hollow shell and the reinforcing core are made of sheet metal, though other materials may also be used. Due to its square cross-section, such a linear construction truss can be used in place of a lumber beam or an I-beam in construction applications. Furthermore, a sheet metal linear construction truss in accordance with the present invention is more lightweight than either a lumber beam or a steel I-beam and requires only cold-rolled processes to manufacture. Thus, it offers the advantages of a sheet metal design, while also offering improved strength over prior art reinforced sheet metal designs.

In a preferred embodiment, the intra-tetrahedral edges that attach to the hollow shell are chamfered to facilitate attachment to the hollow shell. The inter-tetrahedral edges are not chamfered.

Another aspect of the present invention is a method of continuous automated manufacture of a linear construction truss as described above. Both the reinforcing core and the hollow shell can be manufactured from sheet metal strips using simple folding and stamping processes.

In accordance with the manufacturing method of the present invention, two identical sheet metal strips are cut and bent in such a way as to result in a plurality of triangular faces with specified angles between the triangular faces. In a preferred embodiment of the invention, there are chamfers between the triangular faces. The two strips are then intertwined together to form a reinforcing core comprising a plurality of linked regular tetrahedra, and rigidly attached. A sheet metal shell with a square cross-section is then formed around the reinforcing core and rigidly attached to it.

DETAILED DESCRIPTION OF THE INVENTION

Figure 1:
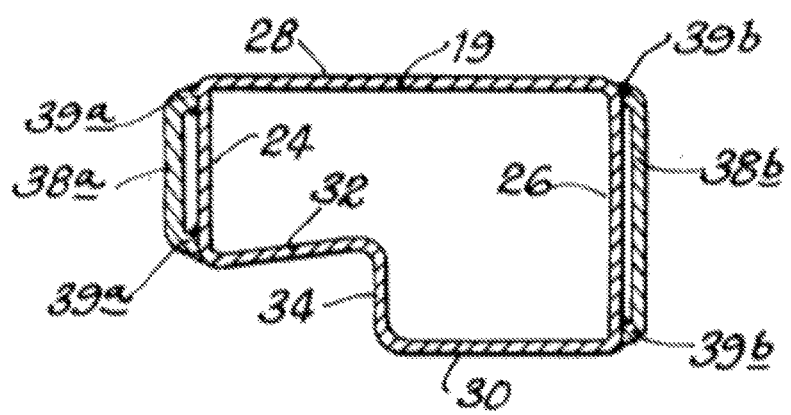
FIG. 1 shows a prior art design of a reinforced hollow sheet metal beam.
Figure 2:
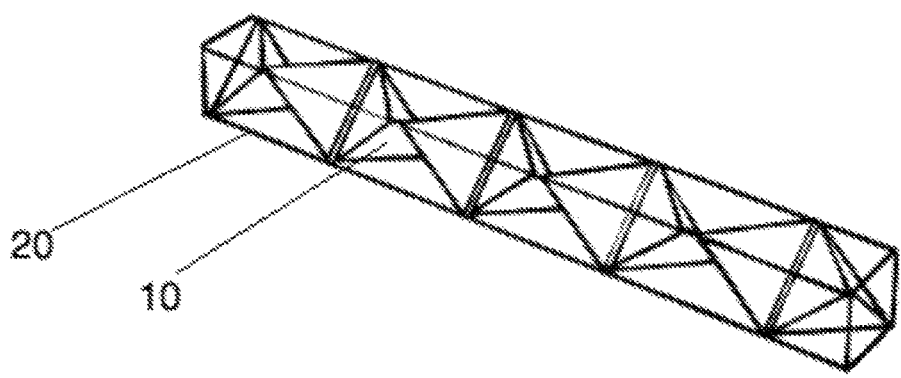
FIG. 2 shows a linear construction truss of the present invention.
Figure 3:
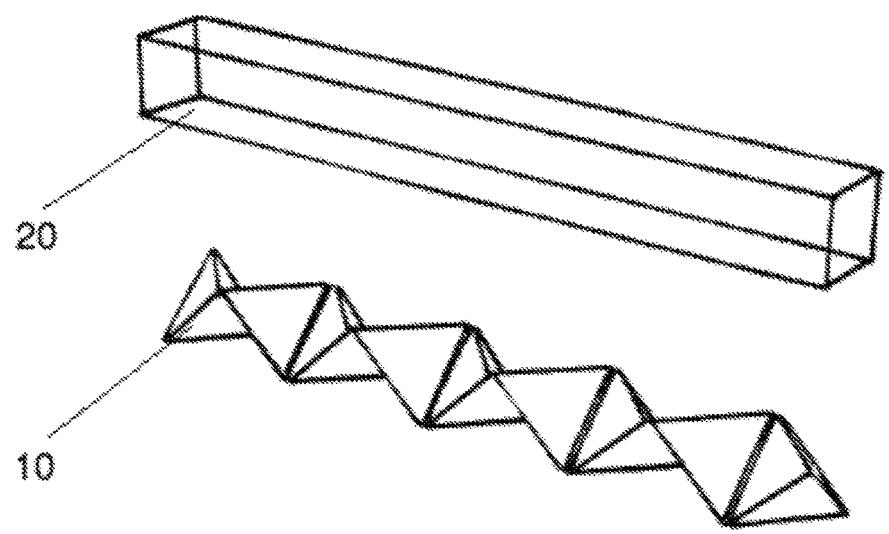
FIG. 3 shows a separate view of the hollow shell and a separate view of the reinforcing core.

FIGS. 2 and 3 show the main component parts of the linear construction truss of the present invention—the reinforcing core 10 and the shell 20. FIG. 2 is a view of the assembled linear construction truss with a transparent view of the hollow shell. FIG. 3 shows a separate view of the reinforcing core and a separate view of the hollow shell. As can be seen in FIG. 2, the reinforcing core 10 comprises a plurality of linked regular tetrahedra, situated inside a hollow shell 20 with a square cross-section such that the linked edges of the tetrahedra are approximately equal to the inner diagonal of the hollow shell. Each tetrahedron, except for the ones located on each end of the truss, is rigidly linked to its two neighboring tetrahedra along two of its edges, and rigidly linked to the inner surface of the hollow shell along its four other edges. This strengthens the structure by providing numerous planar reinforcing surfaces at oblique angles to the load. In a preferred embodiment, both the hollow shell and the reinforcing core are die-formed from continuous sheet metal strips by automated cutting and folding machines that process rolls of sheet metal; it is preferable, though not required, that the sheet metal strips that form the reinforcing core be thinner than the sheet metal strips that form the hollow shell.

Figure 4:
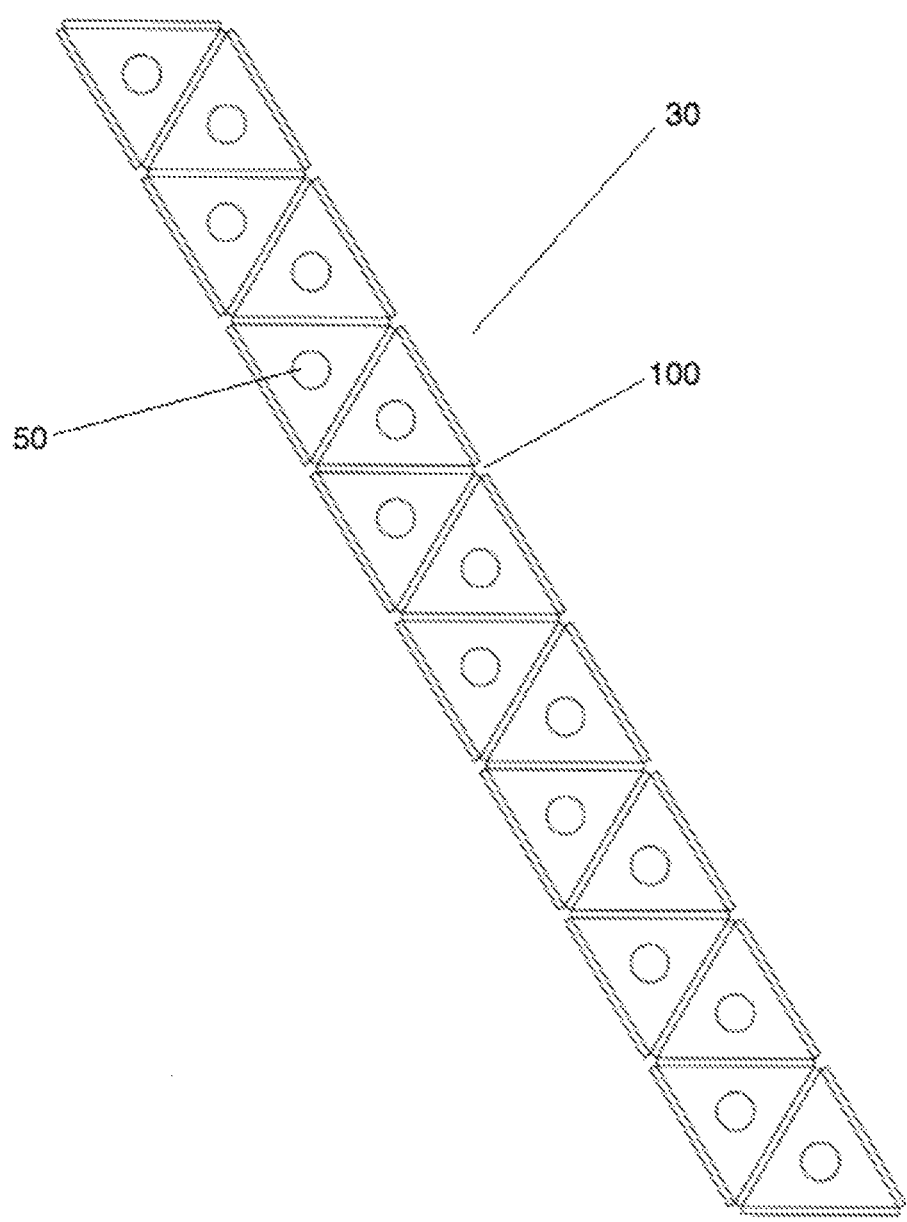
FIG. 4 shows a view of one of the two sheet metal strips used to form the reinforcing core.

FIG. 4 shows one of the two identical sheet metal strips 30 used to form the reinforcing core. In a preferred embodiment, the strip is die-cut with cutouts 100 to facilitate folding and chamfering, and cut with perforations 50 to reduce its weight.

Figure 5:
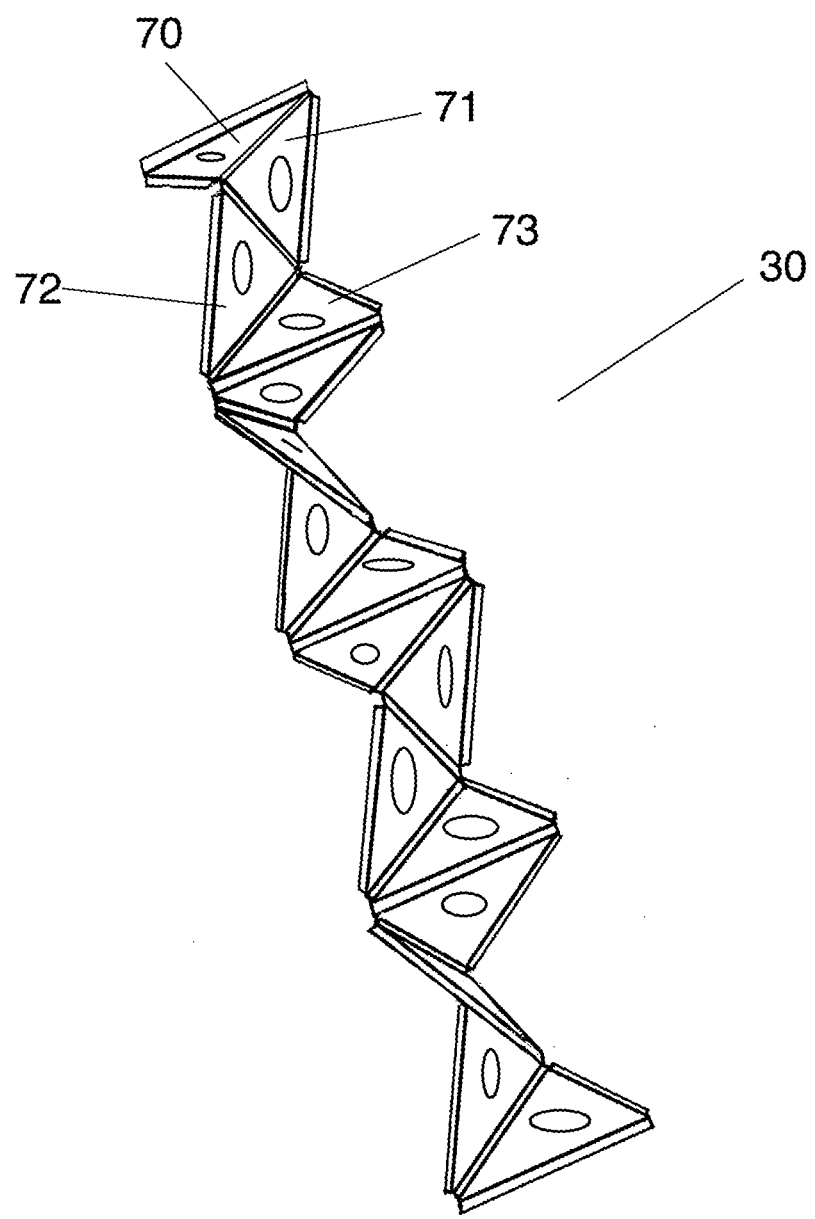
FIG. 5 shows a view of one of the two sheet metal strips used to form the reinforcing core after it is folded in accordance with the present invention.

FIG. 5 shows a view of sheet metal strip 30 after it is folded. The strip 30 is folded in such a way that the dihedral angles between successive triangular faces alternate between 109.4667 degrees and 289.4667 degrees throughout the length of the strip. For example, the dihedral angle between triangular face 70 and triangular face 71 is 109.4667 degrees; the dihedral angle between triangular face 71 and triangular face 72 is 289.4667 degrees; the dihedral angle between triangular face 72 and triangular face 73 is 109.4667 degrees; and so on. This results in a helical shape that can then be intertwined with another identical shape to form a plurality of linked tetrahedra.

Figure 6:
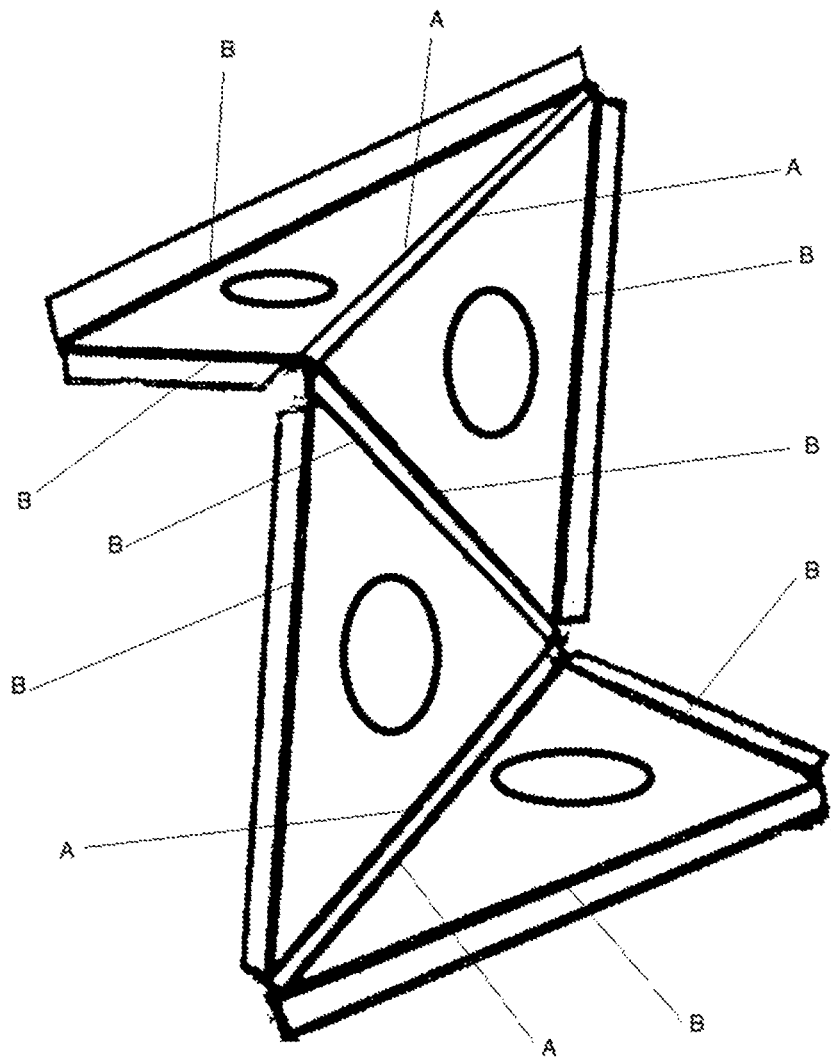
FIG. 6 shows a view of a chamfer between two of the triangular faces of the folded sheet metal strip.

In the preferred embodiment, there are chamfers between the triangular faces, as shown in FIG. 6, which is a magnified view of a section of sheet metal strip 30. The bending angles at the edges labeled "A" are approximately 144.7333 degrees; the bending angles at the edges labeled "B" are approximately 234.7333 degrees. This pattern repeats throughout the length of the strip. The chamfers are intended to facilitate welding, both for welding the two strips together to form the tetrahedra and for welding the tetrahedra to the hollow shell.

Figure 7:
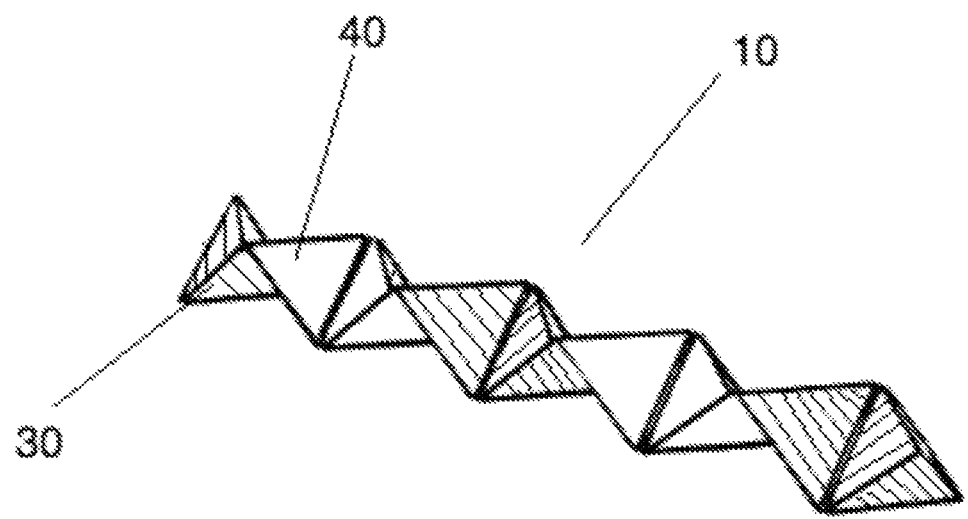
FIG. 7 shows a view of the reinforcing core.

FIG. 7 shows the two sheet metal strips 30 and 40 joined together to form the reinforcing core 10. Sheet metal strip 30 is shaded while sheet metal strip 40 is left unshaded. As can be seen in the figure, each tetrahedral unit derives its parts from both of the two core strips. From each strip, each tetrahedral unit derives two of its four triangular faces, two of its four chamfered edges, and one of its two inter-tetrahedral web layers. The successive inter-tetrahedral web layers are at right angles to each other and normal to the core axis. The core is thus composed of the two helices of equilateral triangles and strips that will be precisely coiled together and, in a preferred embodiment, joined with spot or linear welds.

The hollow shell 20 encloses, triangulates, and is welded to, the core 10, as is shown in FIG. 2. It is a linear tube with a square cross-section. Depending on the machinery deployed, it can comprise one, two, or four separate sheet metal strips. These are die-cut and folded for corners and edge joining, then welded at the seam or seams and welded to the core.

Figure 8:
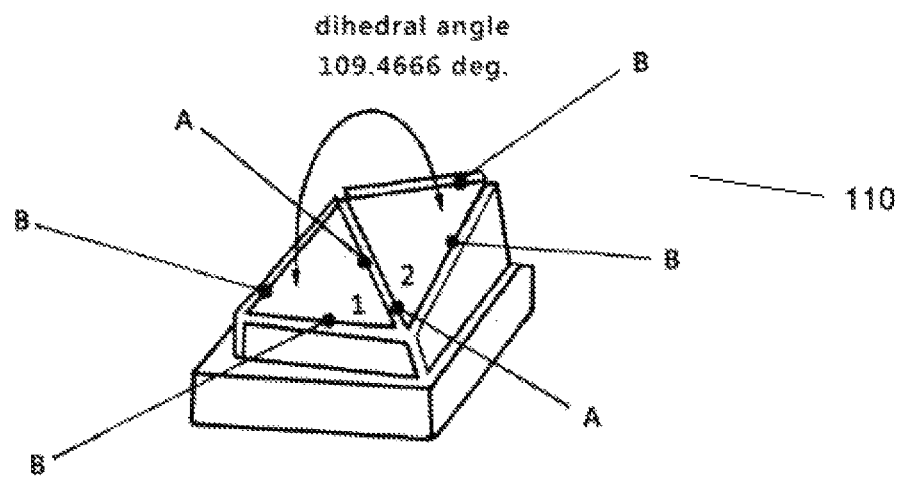
FIG. 8 shows two possible designs for a die used to bend the sheet metal strips that comprise the reinforcing core.
Figure 8:
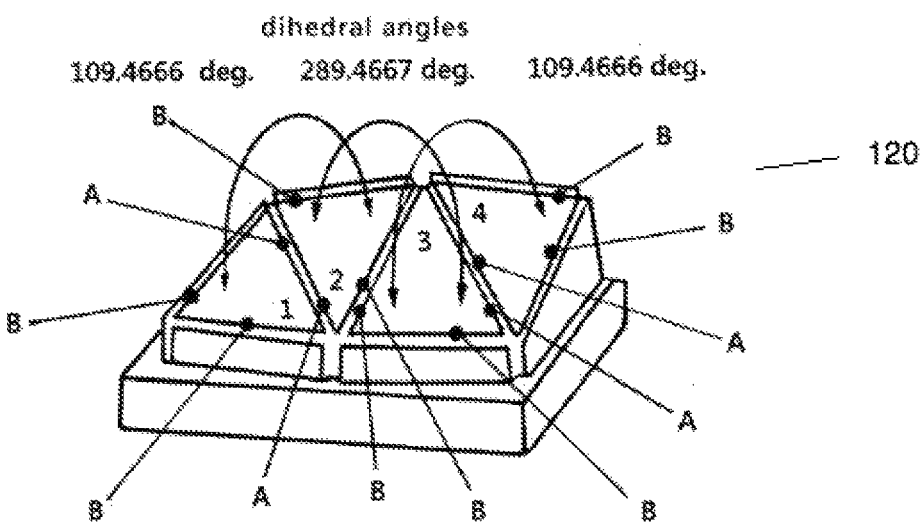

The linear construction truss may be manufactured by using cold-rolled processes such as stamping or bending. FIG. 8 shows two possible designs for a die used to form the folded sheet metal strips that comprise the reinforcing core. Die 110 can achieve the folding of two facets per die strike; die 120 can achieve the folding of four facets per die strike. Alternate numbers of facets may also be used. The chamfer angles are identified on the drawing. For die 110, the dihedral angle between faces 1 and 2 is 109.4666 degrees; the chamfer angles are 144.7333 degrees on the edges marked A and 234.7333 degrees on the edges marked B. For die 120, the dihedral angle between faces 1 and 2 is 109.4666 degrees, as is the dihedral angle between faces 3 and 4. The dihedral angle between faces 2 and 3 is 289.4667 degrees. The chamfer angles are 144.7333 degrees on the edges marked A and 234.7333 degrees on the edges marked B.

Figure 9:
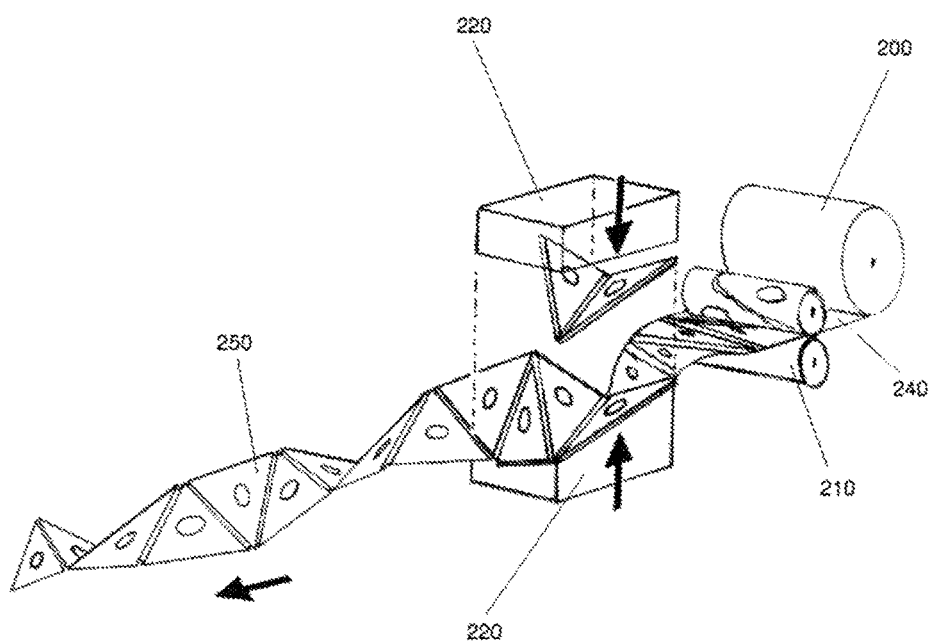
FIG. 9 shows an embodiment of a die forming station.

FIG. 9 shows one possible embodiment of a die forming station that continuously forms a folded sheet metal strip used to form the tetrahedral reinforcing core. A sheet metal strip 240 is continuously fed from a roll 200 into a rotary die cutter 210, which cuts it with cutouts to facilitate folding and chamfering and perforations to reduce its weight. After it is cut, the strip is folded in a die 220. The folded strip 250 is then ready to be welded together with a second identical strip to form the tetrahedral core.

Figure 10:
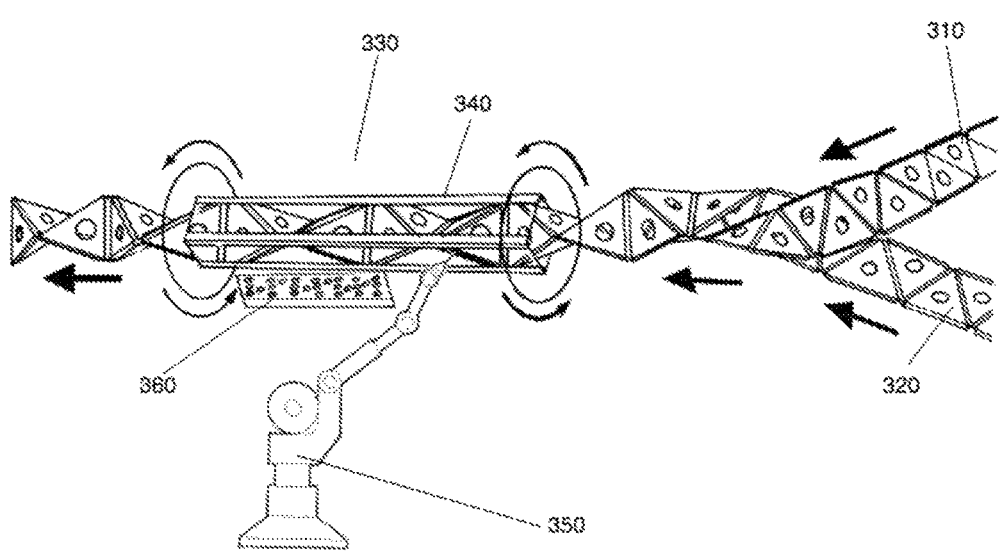
FIG. 10 shows a view of an embodiment of a core assembly station.

FIG. 10 shows an overview of one possible embodiment of a core assembly station that assembles the two folded strips into a tetrahedral reinforcing core. Two folded strips 310 and 320 are continuously fed into a rotating assembly fixture 330, which rotates around the axis of the reinforcing core. The rotating assembly fixture 330 holds the two strips 310 and 320 in correct angular position for welding by means of registration chute 340. Registration chute 340 is an axially revolving rectangular chute that moves the core forward in steps to the next operation. The entire assembly moves forward in steps through the revolving fixture; at each stopping point, automatic welding, performed by a robot 350 or a weld array 360, joins the various weld points of the core, starting with the inter-tetrahedral web and following with the tetrahedral chamfer-flanges. The reinforcing core is then ready to be assembled with the hollow shell at the shell application station.

Figure 11:
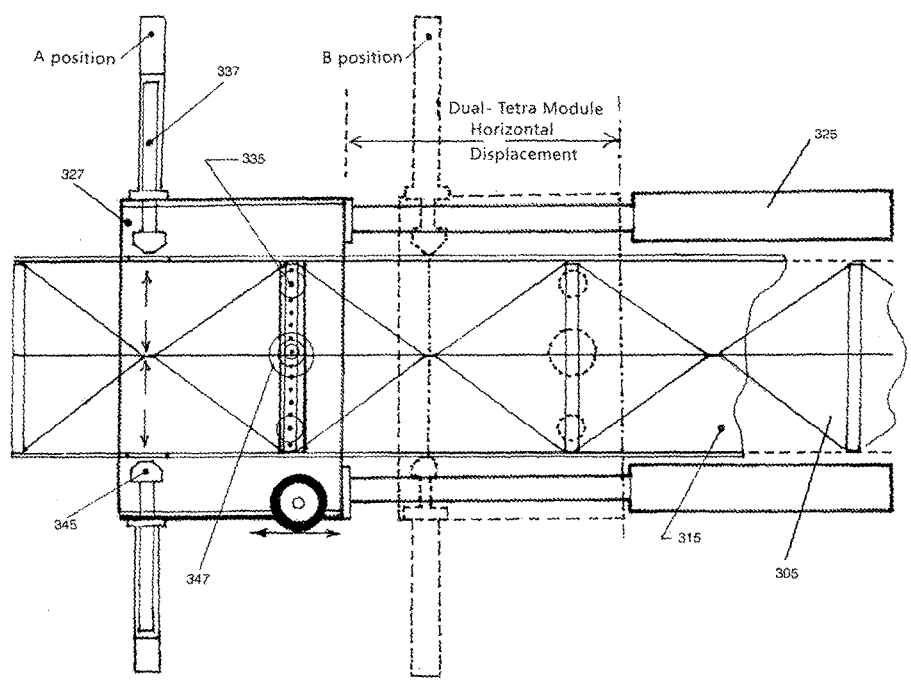
FIG. 11 shows a side view of a web welder module of another embodiment of a core assembly station.
Figure 12:
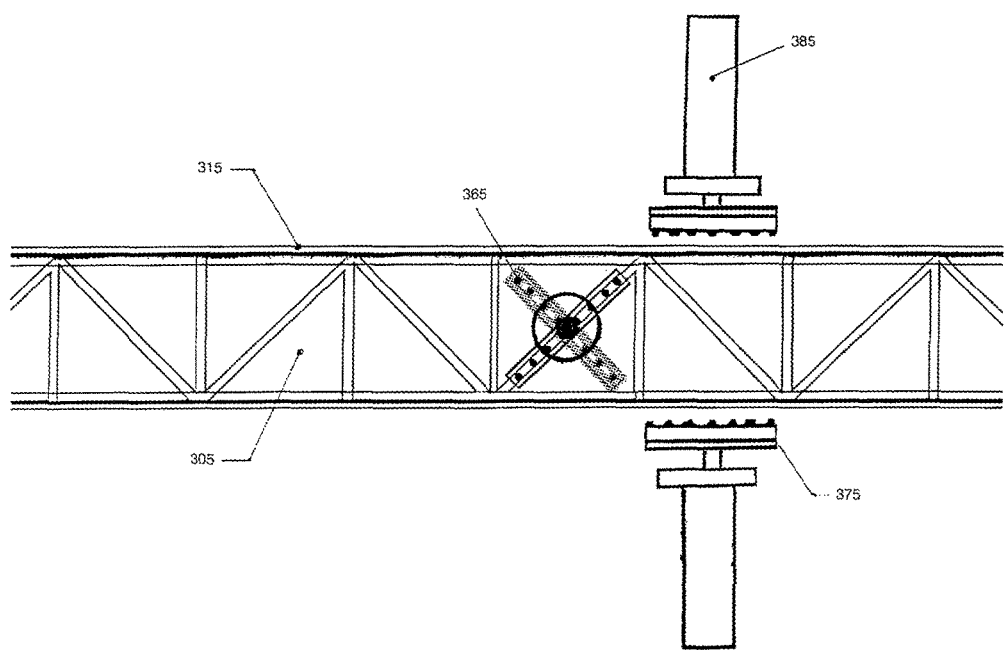
FIG. 12 shows a side view of a chamfer welder module of the same embodiment of a core assembly station.

Another embodiment of a core assembly station is detailed in FIGS. 11 and 12, and comprises two independent modules. One module—the web welder module—welds the intertetrahedral webs of the core, and moves the core forward in steps to the next operation. The other module—the chamfer welder module—welds the chamfered edges of the tetrahedra.

FIG. 11 shows a side view of the web welder module. Truss core 305 enters the assembly module from the right side of the drawing, and is held in the registration chute 315. The main linear actuator 325 moves the weld frame 327, which contains the vertical and horizontal weld arrays into position for the welding of the intertetrahedral webs. Weld array 335 is vertical and is used to weld the vertical intertetrahedral webs; weld array 345 is horizontal and is used to weld the horizontal intertetrahedral webs. Vertical linear actuators 337 move the horizontal weld arrays 345 into position for welding; horizontal linear actuators 347 move the vertical weld arrays 335 into position for welding. The main linear actuator 325 then moves the weld arrays in the direction parallel to the truss core axis and enables them to move the truss core through the module; the range of its displacement is labeled as "Dual-Tetra Module Horizontal Displacement" in FIG. 11. Two positions of the weld arrays—"A position" and "B position"—are shown in FIG. 11.

FIG. 12 shows a side view of the chamfer welder module. This module welds the intratetrahedral edges after the intertetrahedral webs have been welded. Truss core 305 enters this module from the right side of the drawing, and is held in the registration chute 315. The vertical diagonal weld arrays 365 are used to weld the intratetrahedral edges that are vertical; a corresponding set of horizontal diagonal weld arrays 375 are used to weld the intratetrahedral edges that are horizontal. Vertical linear actuators 385 and horizontal linear actuators (not shown) bring the weld arrays into position.

Figure 13:
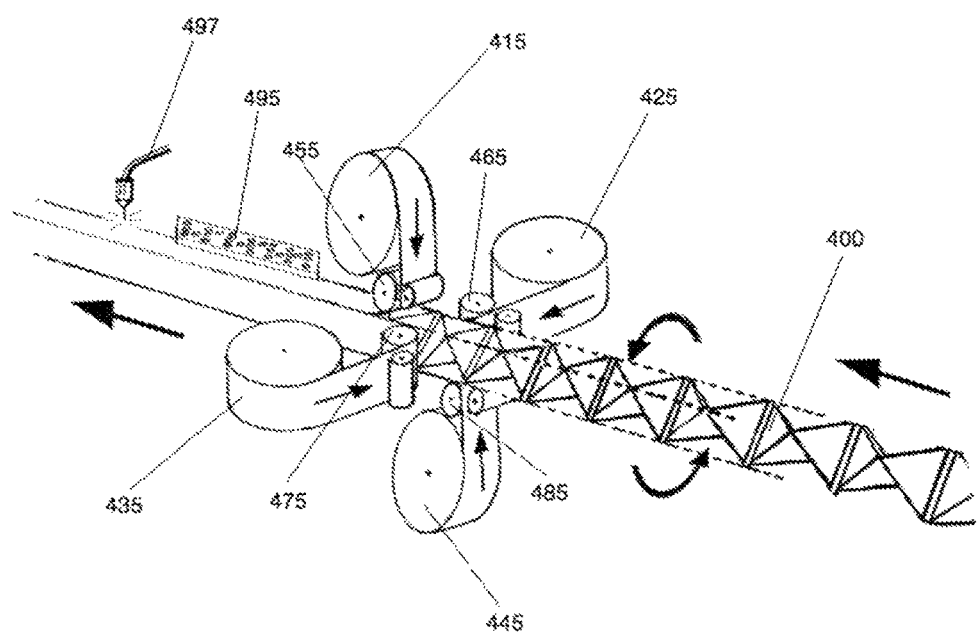
FIG. 13 shows an embodiment of a shell application station.

One embodiment of the shell application station is shown in FIG. 13. The finished core 400 rotates around its axis due to the action of the core assembly station shown in FIGS. 10-12. Four rolls of sheet metal, 415, 425, 435, and 445, rotate along with the core. Rotary dies 455, 465, 475, and 485 apply the four strips of sheet metal to the sides of the core to form the shell; spot weld arrays then weld the strips of sheet metal to the core and corner welders weld the strips of sheet metal together. For clarity, FIG. 13 shows only one spot weld array 495 and one corner welder 497, out of the four required spot weld arrays and four corner welders. This embodiment is not the preferred embodiment of the shell application station because it necessitates that the entire apparatus revolve around the shell axis, which is complex and expensive.

Figure 14:
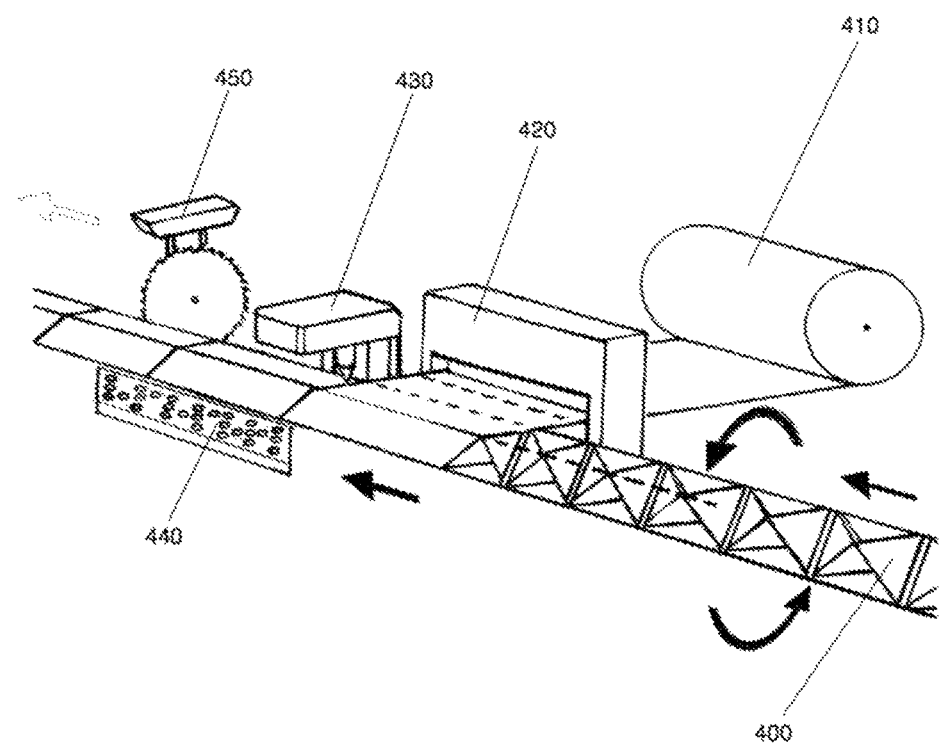
FIG. 14 shows an alternate embodiment of a shell application station.

The preferred embodiment of the shell application station is shown in FIG. 14. The finished core 400 is fed into the shell application station; a roll of sheet metal 410 is fed into a diagonal corner fold die 420 and is applied to the core 400 at an angle that enables it to be wrapped around the core 400 in a spiral pattern. This method of applying the shell is more efficient because the whole apparatus can remain stationary and only the core 400 rotates. A seam welder 430 welds the successive coils of the spiral together; a spot weld array 440 welds the core assembly to the shell. A cut-off saw 450 cuts off finished lengths of the linear construction truss in modular lengths at the tetrahedral web.

The invention claimed is:

1. A method of manufacturing a linear construction truss, comprising:
    bending a first sheet metal strip in such a way as to result in a plurality of equilateral triangular faces where an altitude of each triangular face approximately equals a width of the sheet metal strip, such that:
        an angle between a first triangular face and a second triangular face is approximately 109.5 degrees;
        an angle between the second triangular face and a third triangular face is approximately 289.5 degrees;
        an angle between the third triangular face and a fourth triangular face is approximately 109.5 degrees;
        angles between neighboring faces continue to alternate between approximately 109.5 degrees and approximately 289.5 degrees throughout a length of the first sheet metal strip;
    bending a second sheet metal strip identically to the first sheet metal strip;
    rigidly connecting the bent first sheet metal strip and the bent second sheet metal strip in such a way as to result in a core of linked tetrahedra;
    forming a hollow shell with a square cross-section such that a length of an inner diagonal of the square cross-section is approximately equal to an edge length of the tetrahedral core; and
    rigidly connecting the core to an inside of the hollow shell.

2. The method of claim 1, wherein the bending step comprises chamfering an area between the triangular faces in such a way that the chamfer surfaces can be rigidly connected to a side of the hollow shell.

3. The method of claim 1, wherein the forming step comprises winding a strip of sheet metal around the core in a spiral pattern in order to form the hollow shell.

4. The method of claim 1, wherein the forming step comprises winding a plurality of strips of sheet metal around the core in a spiral pattern in order to form the hollow shell.

5. The method of claim 1, wherein the forming step comprises rigidly connecting four sheet metal sides on an outside of the tetrahedral core in order to form the hollow shell.

6. The method of claim 1, wherein prior to the bending step, one or both of the first sheet metal strip and the second sheet metal strip are cut in such a way that the perforations do not impinge on edges of the tetrahedra.

* * * * *